(No Model.)

C. E. SKINNER.
GAS ENGINE SPEEDER.

No. 352,368.   Patented Nov. 9, 1886.

Witnesses:   Inventor:
Charles E. Skinner,
By  Attorneys.

UNITED STATES PATENT OFFICE.

CHARLES E. SKINNER, OF YONKERS, NEW YORK.

GAS-ENGINE SPEEDER.

SPECIFICATION forming part of Letters Patent No. 352,368, dated November 9, 1886.

Application filed April 17, 1886. Serial No. 199,136. (No model.)

*To all whom it may concern:*

Be it known that I, CHARLES E. SKINNER, a citizen of the United States of America, residing at Yonkers, in the county of Westchester and State of New York, have invented certain new and useful Improvements in Gas-Engine Speeders, of which the following is a specification, reference being had therein to the accompanying drawings.

This invention pertains to improvements in gas-engines, particularly that class wherein the source of ignition to effect the explosion is produced by a dynamo-electric machine or generator, and which latter is driven directly by the gas-engine; and the invention consists of adjustable variable-speed mechanism disposed between the fly or drive wheel of the engine and the dynamo-electric machine, substantially as hereinafter more fully set forth, and pointed out in the claims.

Figure 1:
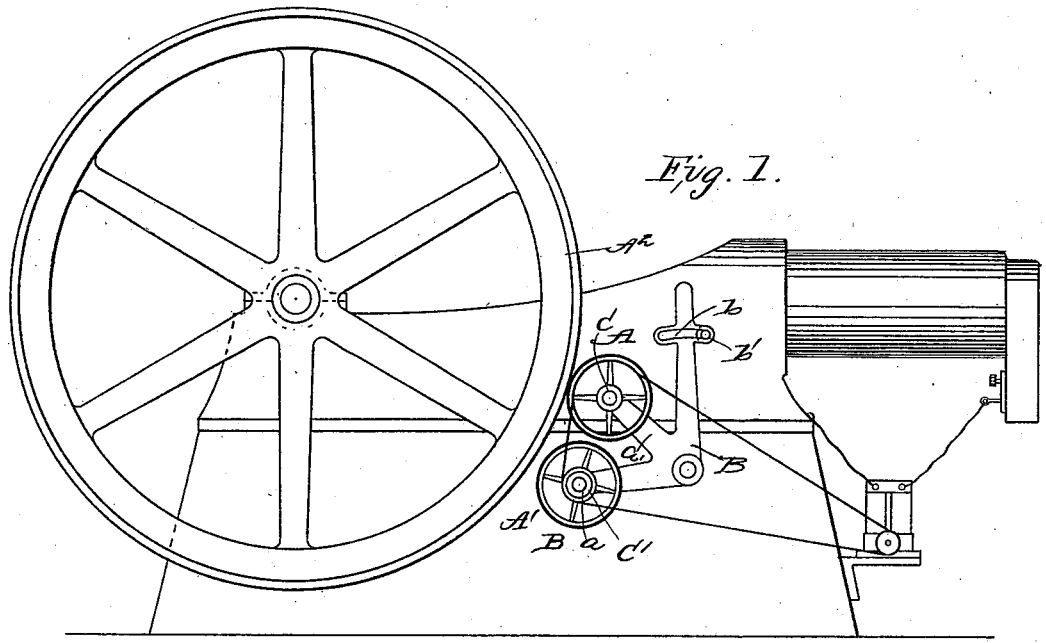
Figure 2:
Figure 3:
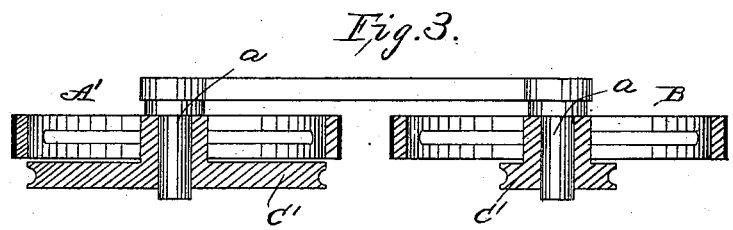

In the accompanying drawings, Figure 1 is a side elevation of a gas-engine and a dynamo-electric machine with my invention applied thereto. Fig. 2 is a plan view of the same with portions of the engine broken away; and Fig. 3 is an enlarged sectional elevation taken through the frictional drive-wheels and pulleys constituting the variable-speed mechanism, the shifting or adjusting lever only being partly shown.

Among other serious objections heretofore experienced in driving gas-engines directly from a dynamo-electric machine it was impossible to secure the proper relative speed between the driving-wheel of the engine and the dynamo upon starting the engine, and after the same had attained the required rate of speed. This was due to the fact that owing to the great diameter of the driving-wheel required to impart the required speed to the dynamo in starting the engine, which is done by slowly turning the wheel by hand, the dynamo would be run at too great or high rate of speed when the engine had attained its running speed, while if the driving-wheel were reduced or proportioned in size to secure the required relative speed of the engine and dynamo, too great labor would have to be expended in turning the wheel to start the engine.

By my invention I have overcome the foregoing difficulties.

In the embodiment of my invention I employ two frictional wheels, A A', the same having their rims or peripheries preferably covered with rubber or other friction-generating material, and being journaled or supported contiguously to the driving-wheels $A^2$, upon studs or trunnions $a\ a$, projecting laterally one from each of the two arms $a'\ a'$ of a three armed or angle lever, B, pivoted at its angle to the supporting-base of the engine. The main arm or handle of this lever has a horizontal enlargement, the same extending from both sides of the lever, and this enlargement is provided with a slightly-curved horizontal slot, $b$, its curvature being in the plane of a true arc. This slot receives a set or adjusting screw, $b'$, projecting from the side of the engine-case, which screw and slot permit of the adjustment or movement of the lever with the frictional wheels A, so as to allow of the movement of either one of said pulleys into engagement or contact with the periphery of the driving-wheel $A^2$. Upon the same hubs with the wheels A A' are cast, or formed integrally therewith pulleys C C', one, C', on the hub of the wheel A', being of much greater diameter than that of the other, C, on the hub of the wheel A. D is a belt, transmitting motion from these pulleys to the driving-pulley or wheel of the dynamo electric machine or generator, as shown.

It will be seen with the wheel A' having the large pulley C' adjusted in contact with the drive-wheel $A^2$, and upon starting the engine, which is effected by slowly turning the said drive-wheel by hand, which drive-wheel is of the usual large size, that, while the dynamo will be driven at first at a high rate of speed and the requisite power be obtained for starting the engine, the speed of the dynamo as the drive-wheel of the engine attains its regular or required running speed can be varied or reduced by shifting the wheel A, carrying the much smaller pulley, C, into engagement with the drive-wheel $A^2$. Thus the difficulties aforenamed, it will be seen, are overcome, without changing the size of the engine drive-wheel, by my invention.

Having thus fully described my invention, what I claim, and desire to secure by Letters Patent, is—

1. The combination, with a gas-engine and a dynamo-electric machine, of the variable or speed-changing mechanism comprising the two-armed lever, and the frictional wheels supported upon trunnions or studs thereof and having pulleys on their hubs for transmitting motion from the engine drive-wheel to the drive-wheel or pulley of the dynamo-machine, either of said wheels being movable into contact or engagement with the drive-wheel, substantially as set forth.

2. The combination, with the gas-engine and the dynamo-electric machine and their drive-wheels, of the lever carrying frictional wheels, the hubs of which wheels are provided one with a large pulley and the hub of the other with a small pulley, and a belt transmitting motion from said pulleys to the drive-wheel or pulley of the dynamo-machine, substantially as and for the purpose set forth.

3. The combination, with the engine and the dynamo-electric machine and their drive-wheels, of the lever having a horizontal slot receiving an adjusting or set screw, the frictional wheels supported upon trunnions or studs of two arms of the lever and carrying different-sized pulleys, and a belt transmitting motion from the said wheels to the dynamo-machine, substantially as and for the purpose set forth.

4. In a gas-engine wherein the explosion is produced by the spark of an electric current generated by a dynamo-electric machine, the method of operating, substantially as herein described, of temporarily increasing the relative speed of the dynamo while starting the engine, and of decreasing said speed when the engine has attained its regular or required speed by means of two wheels secured on arms of a lever, said wheels having one a large and the other a small pulley on their hubs, substantially as shown and described.

In testimony whereof I affix my signature in presence of two witnesses.

CHARLES E. SKINNER.

Witnesses:
M. K. COUZENS,
WM. C. KELLOGG.